No. 860,035. PATENTED JULY 16, 1907.
C. V. KERR.
SHAFT PACKING FOR STEAM TURBINES.
APPLICATION FILED NOV. 5, 1906.
2 SHEETS—SHEET 2.
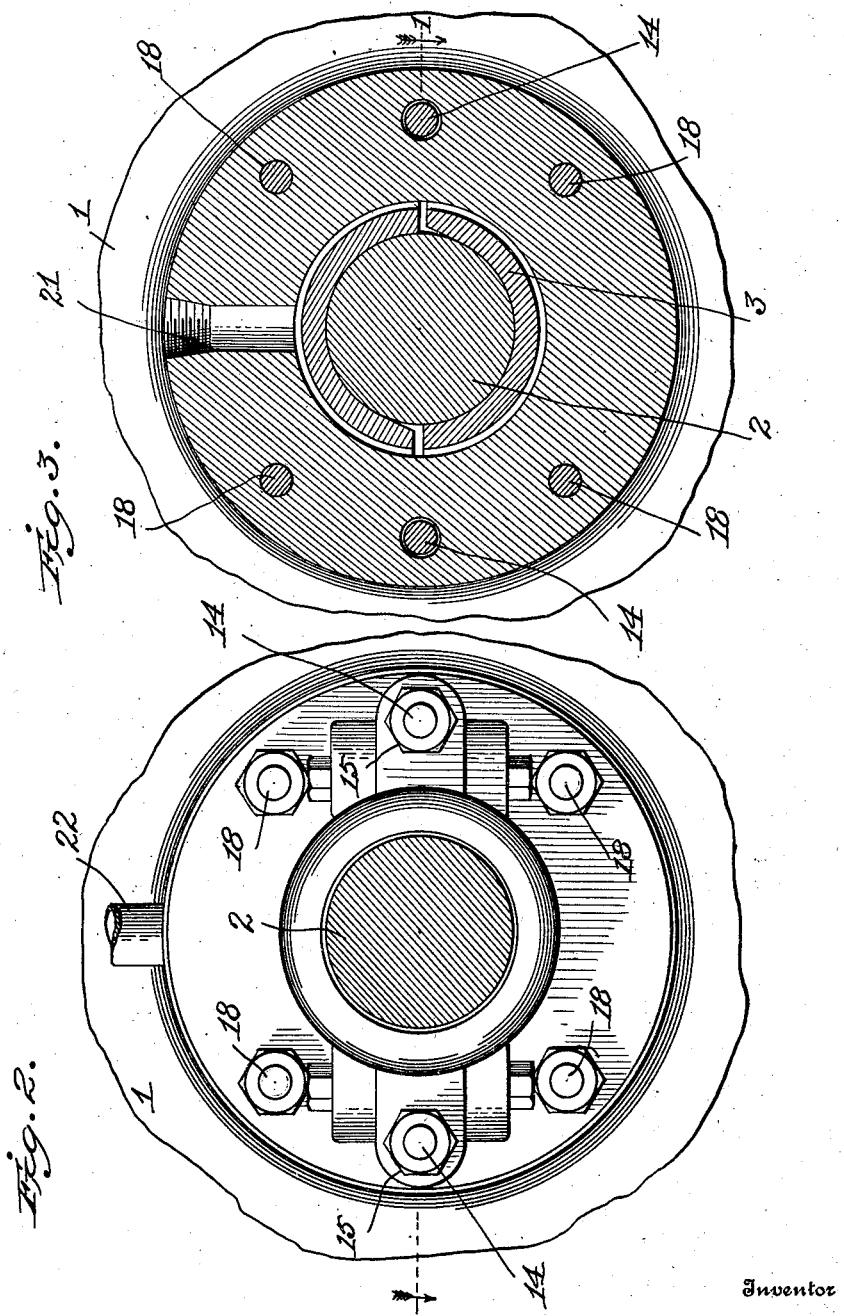
Witnesses
Edwin L. Yewell
J. H. Hall
Inventor
Charles V. Kerr.
By W. E. Schoenborn
Attorney

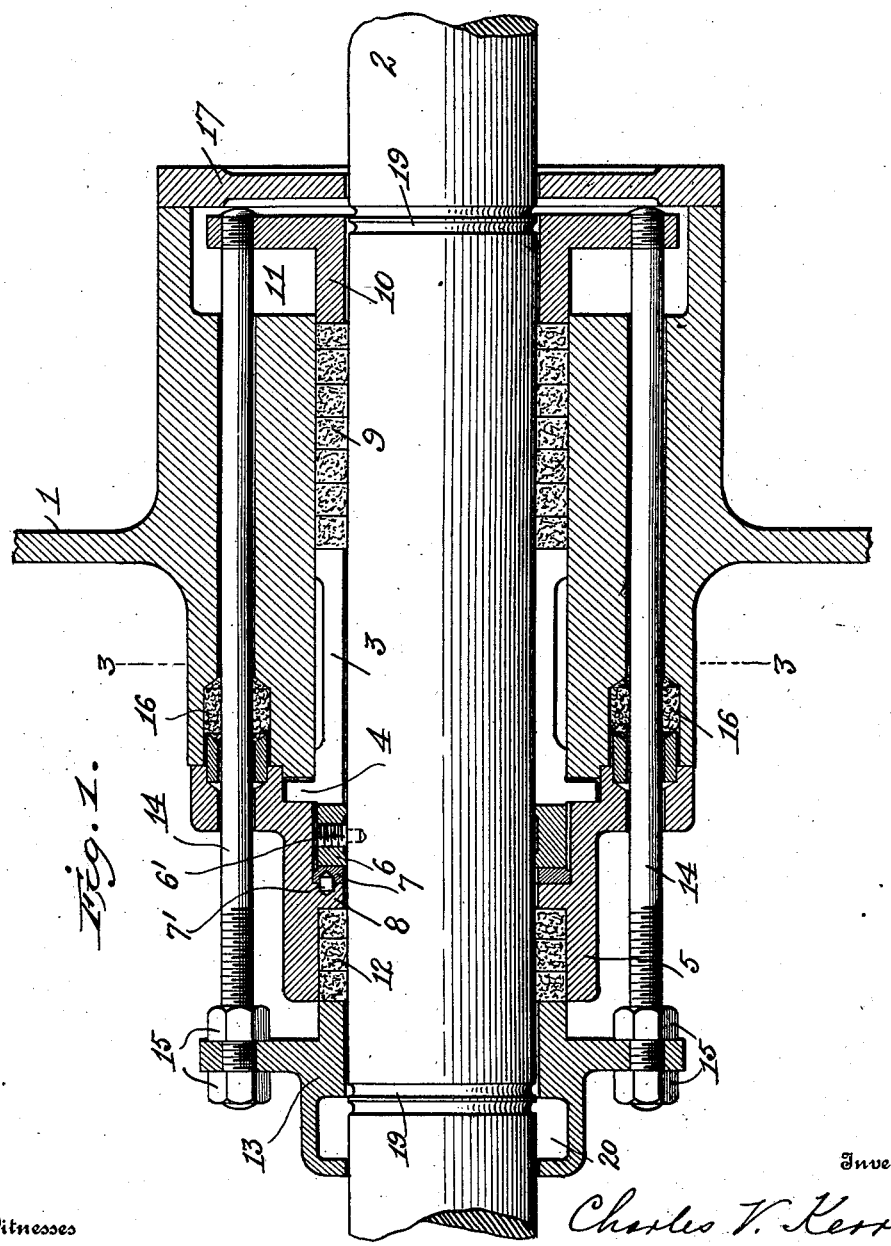

UNITED STATES PATENT OFFICE.

CHARLES V. KERR, OF WELLSVILLE, NEW YORK, ASSIGNOR TO KERR TURBINE COMPANY, OF WELLSVILLE, NEW YORK, A CORPORATION OF NEW YORK.

SHAFT-PACKING FOR STEAM-TURBINES.

No. 860,035.          Specification of Letters Patent.          Patented July 16, 1907.

Application filed November 5, 1906. Serial No. 342,042.

*To all whom it may concern:*

Be it known that I, CHARLES V. KERR, a citizen of the United States, residing at Wellsville, in the county of Allegany and State of New York, have invented certain new and useful Improvements in Shaft-Packings for Steam-Turbines, of which the following is a specification.

My invention relates to a combined shaft packing and bearing for elastic fluid turbines such for example as are shown in the patent to Charles V. Kerr, No. 798,105, August 29, 1905.

The object of my invention is to provide an improved shaft packing and bearing for elastic fluid turbines comprising inner and outer packing located upon either side of the supporting bearing for the turbine shaft, with means for applying pressure to both said packings to properly adjust the same; to provide such a combined packing and bearing with means for preventing longitudinal movement of the shaft; the packing and the bearing and elements coöperating therewith being so designed and arranged as to be readily disassembled to permit inspection or repair without necessitating the removal of the main shaft of the turbine and disks carried thereon; and to the above ends my invention consists of the features of construction and relative arrangement of elements hereinafter more particularly disclosed in the specification and defined in the appended claims.

In the accompanying drawings, in which similar reference characters indicate the same parts in the several views, Figure 1, is a central vertical longitudinal section of the device on the line 1—1 of Figs. 2 and 3; Fig. 2, is an elevation viewed from outside the turbine casing; Fig. 3, is a vertical section upon the line 3—3 of Fig. 1.

Referring to the drawings, the reference numeral 1 designates a portion of the casing of the turbine, and 2 the shaft thereof. The casing 1 supports the combined shaft packing and bearing as shown for which purpose it is bared concentric with the shaft, and in the opening thus formed is located the main shaft bearing 3. This bearing is made of bronze or other suitable material, and after having been turned in cylindrical form, is split longitudinally in order that it may be easily put in place and readily removed from the casing. This bearing is provided with a projecting portion A, adapted to be engaged by the cap piece 5 for the purpose of securing the bearing in place.

6 is a collar detachably secured in any suitable
manner as by a screw 6' to the shaft 2, one face of which bears against the main bearing 3 as shown, while the other face thereof is engaged by a ring 7 supported by means of pin 7' to an upwardly extending ledge 8 of the cap piece 5. It will thus be seen that the collar while
free to rotate with the shaft 2 is restrained as to longitudinal movement, and the disks carried by the shaft maintained in line with the nozzle of the turbine.

9 is an inside packing located in the opening in the casing carrying the shaft bearing, and designed to prevent the flow of oil along the shaft toward the interior of the turbine casing, or the flow of steam from said casing. 10 is an inside follower located in a recess 11 formed in the casing 1, through which follower the requisite pressure may be applied to the inside packing.

12 is an outside packing located in a recess in the cap piece 5 as shown to prevent the flow of oil along the shaft, and 13 is an outside follower through which the requisite pressure may be applied to the outside packing.

The inside and outside followers are connected by rods 14, 14 engaging the inside follower and having lock nuts 15 at their outer extremities. These rods pass through openings in the casing, and are surrounded by packing glands, 16, to prevent the passage of steam outward or of air inward.

17 is a cover plate, covering the recess 11 in which is located the inside follower 10 and may be secured to the casing in any suitable manner.

18 represents a series of stud bolts by means of which the cap piece 5 is secured to the casing 1; and 19, 19, are oil slingers designed to intercept oil traveling along the shaft and throw it therefrom by centrifugal action in a manner well known, such oil being conducted from the recess 11 and from a cavity 20 in the outside follower 13 by any suitable means.

It is intended that oil will be supplied to the bearing under some pressure, so that the bearing 3, collar 6, and ring 7 will at all times be submerged in oil; to which end I provide a passage 21 and pipe 22 through which oil is supplied to the bearing.

From the construction above set forth it will be seen that upon loosening the inner lock nut 15 and screwing up the outer lock nut so as to draw the followers 10 and 13 together, pressure is applied to the outside packing 12 through the follower 13, and at the same time and by the same act pressure is also applied to the inside packing, 9, through the follower 10 and rods 14; and that substantially the same amount of pressure is applied to both the inside and outside packings. When the desired adjustment of the inside and outside packings has been secured the inner lock nut is tightened up and the whole adjusting mechanism securely held in its adjusted position.

My construction also permits the ready disassembling of the whole combined packing and bearing and the removal of the shaft bearing member thereof for inspection and renewal, without removing the shaft from the turbine casing or interfering with its adjustment therein. To accomplish this, the fastenings of the follower 13 and cap piece 5 are removed, thus allowing them to be moved along the shaft out of the way. The collar 6 is thus exposed, and, being detachably secured to the shaft, may in like manner be removed. The bearing member is then exposed, and, being made up of a plurality of parts, may be removed from its support and a new one substituted if necessary. The packing 9 can in the same way be removed or replaced.

Having now fully described my invention, what I claim as new and desire to secure by Letters Patent is:—

1. In a combined shaft packing and bearing for elastic fluid turbines, a turbine casing, an opening therein, a shaft bearing supported in said opening and secured against longitudinal movement, a rotary horizontal shaft supported in said bearing, packing located in said opening between the bearing and the interior of the casing, and means for compressing said packing.

2. In a combined shaft packing and bearing for elastic fluid turbines, a turbine casing, an opening therein, a shaft bearing comprising a plurality of sections supported in said opening and secured against longitudinal movement, a rotary horizontal shaft supported in said bearing, packing located in said opening between the bearing and the interior of the casing, and means for compressing said packing.

3. In a combined shaft packing and bearing for elastic fluid turbines, a turbine casing, an opening therein, a shaft bearing supported in said opening and secured against longitudinal movement, a rotary horizontal shaft supported in said bearing, packing located in said opening between the bearing and the interior of the casing, and means operable from without the casing for compressing said packing.

4. In a combined shaft packing and bearing for elastic fluid turbines, a turbine casing, an opening therein, a shaft bearing supported in said opening and secured against longitudinal movement, a rotary horizontal shaft supported in said bearing, packing located in said opening between the bearing and the interior of the casing, a follower engaging said packing, rods engaging said follower and extending without the casing, and means for moving said rods to thereby compress the packing.

5. In a combined shaft packing and bearing for elastic fluid turbines, a turbine casing, an opening therein, a shaft bearing supported in said opening and secured against longitudinal movement, a rotary horizontal shaft supported in said bearing, packing located in said opening between the bearing and the interior of the casing, a recess in the casing adjacent the inner end of said packing, a follower located in said recess for compressing said packing, means operable from without the casing for moving said follower toward the bearing to thereby compress the packing, and a cover plate for said recess.

6. In a combined shaft packing and bearing for elastic fluid turbines, a turbine casing, an opening therein, a shaft bearing supported in said opening and secured against longitudinal movement, a rotary horizontal shaft supported in said bearing, packing located in said opening between the bearing and the interior of the casing, a follower engaging said packing, threaded rods engaging said follower and extending without the casing, and nuts upon the threaded portion of the rods, whereby the rods may be moved to thereby compress the packing.

7. In a combined shaft packing and bearing for elastic fluid turbines, a turbine casing, an opening therein, a shaft bearing supported in said opening and secured against longitudinal movement, a rotary horizontal shaft supported in said bearing, packing located in said opening between the bearing and interior of the casing, a recess in the casing adjacent the inner end of said packing, a follower located in said recess and engaging the packing, threaded rods engaging said follower and extending without the casing, nuts upon the threaded portion of the rods, whereby said rods may be moved to thereby compress the packing, a cover plate for said recess, and packing glands surrounding the said rods.

8. In a combined shaft packing and bearing for elastic fluid turbines, a turbine casing, an opening therein, a shaft bearing supported in said opening and secured against longitudinal movement, packing located in said opening between said bearings and the interior of the casing, a second packing located between the bearing and the external atmosphere, and means to simultaneously compress both said packings.

9. In a combined shaft packing and bearing for elastic fluid turbines, a turbine casing, an opening therein, a shaft bearing supported in said opening and secured against longitudinal movement, packing located in said opening between said bearing and the interior of the casing, a second packing located between the bearing and the external atmosphere, and means operable from without the casing for simultaneously compressing both said packings.

10. In a combined shaft packing and bearing for elastic fluid turbines, a turbine casing, an opening therein, a shaft bearing supported in said opening and secured against longitudinal movement, packing located in said opening between the bearing and the interior of the casing, a follower engaging said packing, a second packing located between the bearing and the external atmosphere, a second follower engaging said second packing, rods engaging said first mentioned follower and extending without said casing and through openings in said second follower, and means cooperating with said rods for varying the distance between said followers to thereby simultaneously compress both said packings.

11. In a combined shaft packing and bearing for elastic fluid turbines, a turbine casing, an opening therein, a shaft bearing supported in said opening and secured against longitudinal movement, packing located in said opening between the bearing and the interior of the casing, a follower engaging said packing, a second packing located between the bearing and the external atmosphere, a second follower engaging said second packing, threaded rods engaging said first mentioned follower and extending without said casing and through openings in said second follower, and nuts upon the threaded ends of said rods whereby the followers may be simultaneously moved toward each other and both packings thereby compressed.

12. In a combined shaft packing and bearing for elastic fluid turbines, a turbine casing, an opening therein, a shaft bearing supported in said opening and secured against longitudinal movement, packing located in said opening between the bearing and the interior of the casing, a recess in the casing adjacent the inner end of said packing, a follower located in said recess and engaging said packing, a cover plate for said recess, a second packing located between the bearing and the external atmosphere, a second follower engaging said second packing, threaded rods engaging said first mentioned follower and extending without said casing and through openings in said second follower, and nuts upon the threaded ends of said rods, whereby the followers may be simultaneously moved toward each other and both packings thereby compressed.

13. In a combined shaft packing and bearing for elastic fluid turbines, a turbine casing, an opening therein, a cap piece secured to said casing, a shaft bearing supported in said opening and provided with a projection extending between the cap and casing, whereby the bearing is secured against longitudinal movement, packing located in the opening in the casing and between the bearing and the interior of the casing, a recess in said cap piece, a second packing located in said recess, followers adapted to engage said packings, rods engaging both said followers, and means operable from without the casing and cooperating with said rods for varying the distance between said followers to thereby simultaneously compress both said packings.

14. In a combined shaft packing and bearing for elastic fluid turbines, a turbine casing, an opening therein, a cap piece secured to said casing, a shaft bearing supported in said opening and provided with a projection extending between the cap and casing whereby the bearing is secured against longitudinal movement, packing located in the opening in the casing and between the bearing and the interior of the casing, a recess in said cap piece, a second packing located in said recess, followers adapted to engage said packings, threaded rods engaging both said followers, and nuts upon the threaded outer ends of said rods, whereby the distance between the followers may be varied and the packings simultaneously compressed.

15. In a combined shaft packing and bearing for elastic fluid turbines, a turbine casing, an opening therein, a cap piece secured to said casing, a shaft bearing supported in said opening and provided with a projection extending between the cap and casing, whereby the bearing is secured against longitudinal movement, packing located in the opening in the casing and between the bearing and the interior of the casing, a recess in the casing adjacent the inner end of said packing, a cover plate for said recess, a recess in said cap piece, a second packing located in said recess, followers adapted to engage said packings, threaded rods engaging both said followers, and nuts upon the threaded outer ends of said rods, whereby the distance between the followers may be varied and the packings simultaneously compressed.

16. In a combined shaft packing and bearing for elastic fluid turbines, a turbine casing, an opening therein, a cap piece secured to said casing, a shaft bearing supported in said opening and provided with a projection extending between the cap and casing, whereby the bearing is secured against longitudinal movement, packing located in the opening in the casing and between the bearing and the interior of the casing, a recess in the casing adjacent the inner end of said packing, a cover plate for said recess, a recess in said cap piece, a second packing located in said recess, followers adapted to engage said packings, threaded rods engaging both said followers, glands for said rods located between the cap piece and casing, and nuts upon the threaded outer ends of said rods, whereby the distance between the followers may be varied and the packings simultaneously compressed.

17. In a combined shaft packing and bearing for elastic fluid turbines, a shaft, two packing members located at a distance from each other, a bearing for said shaft located between said packing members, and means, located also between said packing members, for preventing longitudinal movement of said shaft.

18. In a combined shaft packing and bearing for elastic fluid turbines, a shaft, two packing members located at a distance from each other, a bearing for said shaft located between said packing members, a bearing ring, and a collar upon the shaft between the bearing and ring and in contact with both, whereby longitudinal movement of said shaft is prevented.

19. In a combined shaft packing and bearing for elastic fluid turbines, a shaft, a turbine casing, an opening therein, a shaft bearing comprising a plurality of sections supported in said opening and secured against longitudinal movement, a bearing ring, a collar secured to said shaft and located between the outer end of the bearing and the bearing ring, packing located in said opening between the bearing and the interior of the casing, and means operable from without the casing for compressing said packing.

20. In a combined shaft packing and bearing for elastic fluid turbines, a shaft, a turbine casing, an opening therein, a shaft bearing comprising a plurality of sections supported in said opening and secured against longitudinal movement, a bearing ring, a collar secured to said shaft and located between the outer end of the bearing and the bearing ring, packing located in said opening between the bearing and the interior of the casing, a follower engaging said packing, rods engaging said follower and extending without the casing, and means for moving said rods to thereby compress the packing.

21. In a combined shaft packing and bearing for elastic fluid turbines, a shaft, a turbine casing, an opening therein, a shaft bearing comprising a plurality of sections supported in said opening, and secured against longitudinal movement, a bearing ring, a collar secured to said shaft, and located between the outer end of the bearing and the bearing ring, packing located in said opening between the bearing and the interior of the casing, a recess in the casing adjacent the inner end of said packing, a follower located in said recess and engaging the packing, threaded rods engaging said follower and extending without the casing, nuts upon the threaded portion of the rods, whereby said rods may be moved to thereby compress the packing, and a cover plate for said recess.

22. In a combined shaft packing and bearing for elastic fluid turbines, a shaft, a turbine casing, an opening therein, a shaft bearing comprising a plurality of sections supported in said opening and secured against longitudinal movement, a bearing ring, a collar secured to said shaft and located between the outer end of the bearing and the bearing ring; packing located in said opening between the bearing and the interior of the casing, a second packing located between the bearing ring and the external atmosphere, and means operable from without the casing for simultaneously compressing both said packings.

23. In a combined shaft packing and bearing for elastic fluid turbines, a shaft, a turbine casing, an opening therein, a shaft bearing comprising a plurality of sections supported in said opening and secured against longitudinal movement, a bearing ring, a collar secured to said shaft and located between the outer end of the bearing and the bearing ring, packing located in said opening between the bearing and the interior of the casing, a follower engaging said packing, a second packing located between the bearing ring and the external atmosphere, a second follower engaging said second packing, rods engaging said first mentioned follower, and extending without said casing and through openings in said second follower, and means cooperating with said rods for varying the distance between said followers to thereby simultaneously compress both said packings.

24. In a combined shaft packing and bearing for elastic fluid turbines, a shaft, a turbine casing, an opening therein, a cap piece secured to said casing, a shaft bearing comprising a plurality of sections supported in said opening and provided with a projection extending between the cap and casing, a bearing ring carried by said cap, a collar secured to said shaft and located between the outer end of the bearing and the bearing ring, packing located in the opening in the casing, and between the bearing and the interior of the casing, a recess in said cap piece, a second packing located in said recess, followers engaging said packings, rods connecting said followers, and means cooperating with said rods for varying the distance between said followers to thereby simultaneously compress both said packings.

25. In a combined shaft packing and bearing for elastic fluid turbines, a shaft, a turbine casing, an opening therein, a cap piece secured to said casing, a shaft bearing comprising a plurality of sections supported in said opening and provided with a projection extending between the cap and casing, a bearing ring carried by said cap, a collar secured to said shaft and located between the outer end of the bearing and the bearing ring, packing located in the opening in the casing and between the bearing and the interior of the casing, a recess in said cap piece, a second packing located in said recess, followers adapted to engage said packings, threaded rods engaging both said followers, and nuts upon the threaded outer ends of said rods.

26. In a combined shaft packing and bearing for elastic fluid turbines, a shaft, a turbine casing, an opening therein, a cap piece secured to said casing, a shaft bearing comprising a plurality of sections supported in said opening and provided with a projection extending between the cap and casing, a bearing ring carried by said cap, a collar secured to said shaft and located between the outer end of the bearing and the bearing ring, packing located in the opening in the casing, a recess in said casing adjacent the inner end of said packing, a cover plate for said recess, a follower in said recess engaging said packing, a recess in said cap piece, a second packing located in said recess, a second follower engaging said second packing, threaded rods engaging both said followers, and nuts upon the threaded outer ends of said rods whereby said packings may be simultaneously compressed.

In testimony whereof I affix my signature in presence of two witnesses.

CHARLES V. KERR.

Witnesses:
E. A. RATHBONE,
GEO. B. ROOTH, Jr.